United States Patent [19]
Adams

[11] 3,889,913
[45] June 17, 1975

[54] SEAT SLIDE MECHANISM
[75] Inventor: Albert John Adams, Fetcham, England
[73] Assignee: A. W. Chapman Limited, London, England
[22] Filed: May 14, 1973
[21] Appl. No.: 359,784

[30] Foreign Application Priority Data
June 6, 1972 United Kingdom.............. 26245/72

[52] U.S. Cl................................ 248/430; 308/6 R
[51] Int. Cl............................................ B60m 1/08
[58] Field of Search............. 248/430, 429; 308/6 R; 74/533

[56] References Cited
UNITED STATES PATENTS

| 2,096,437 | 10/1937 | Potter | 248/430 |
|---|---|---|---|
| 2,195,349 | 3/1940 | Woina | 248/430 |
| 2,261,504 | 11/1941 | Saunders | 308/6 R |
| 2,336,433 | 12/1943 | Woina | 248/430 |
| 2,812,222 | 11/1957 | Gossack | 308/6 R |
| 3,350,046 | 10/1967 | Kirk | 248/430 |
| 3,394,912 | 7/1968 | Bullen | 248/430 |
| 3,491,979 | 1/1970 | Wonell | 248/430 |
| 3,685,872 | 8/1972 | Babbs | 248/430 |
| 3,711,057 | 1/1973 | Marx | 248/430 |

FOREIGN PATENTS OR APPLICATIONS
648,183 1/1951 United Kingdom................ 248/429

Primary Examiner—Marion Parsons, Jr.
Attorney, Agent, or Firm—Irving M. Weiner

[57] ABSTRACT

A seat slide mechanism whose rail (fixed to the floor of a vehicle for example) and slide (fixed to the underside of a seat) move relative to one another on four rollers which are arranged in longitudinally spaced pairs. Each pair of rollers is housed in a roller retainer with complete freedom for rotation therein, and parts of each roller retainer are wrapped around and under the rail flanges so as to prevent the rail from making contact with the slide. Portions of said parts are so bowed as to impart a degree of springing thereto such as will tend to eliminate rattle when the seat is not supporting a load.

4 Claims, 9 Drawing Figures

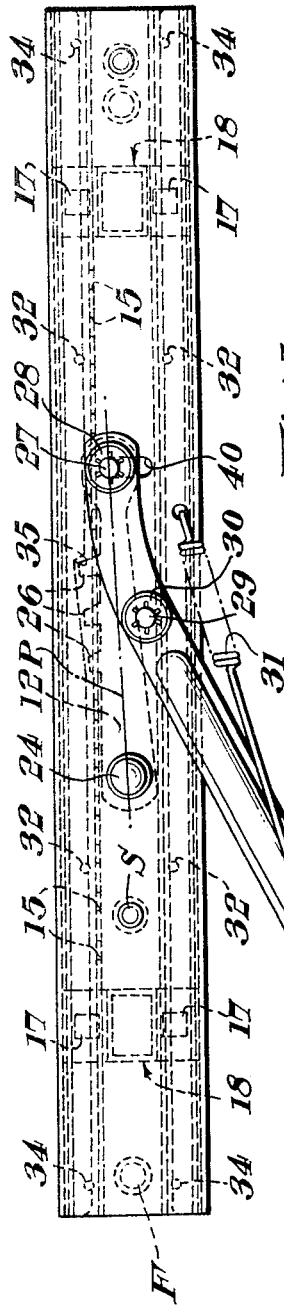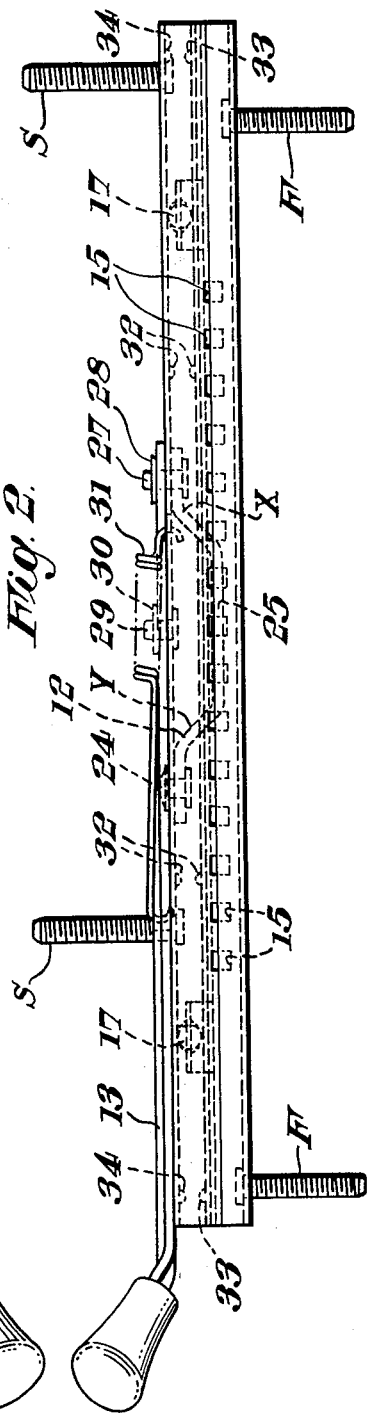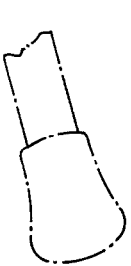

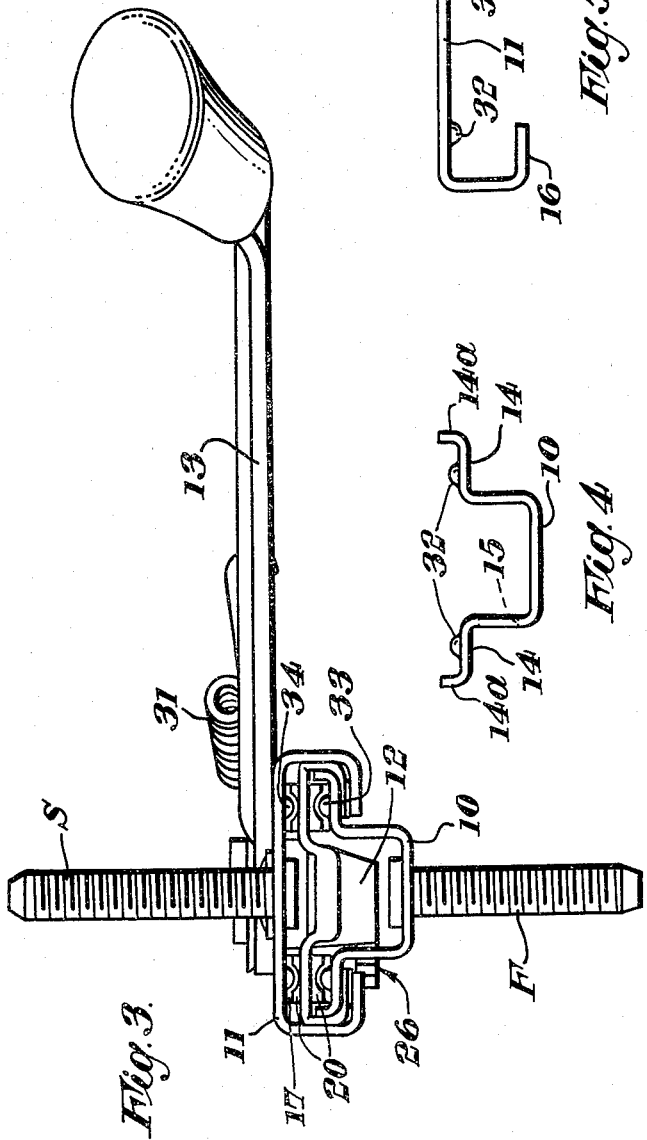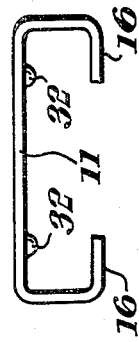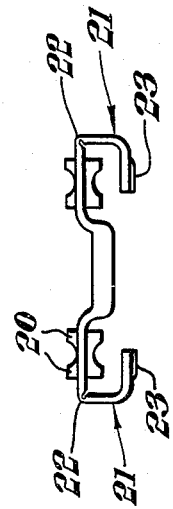

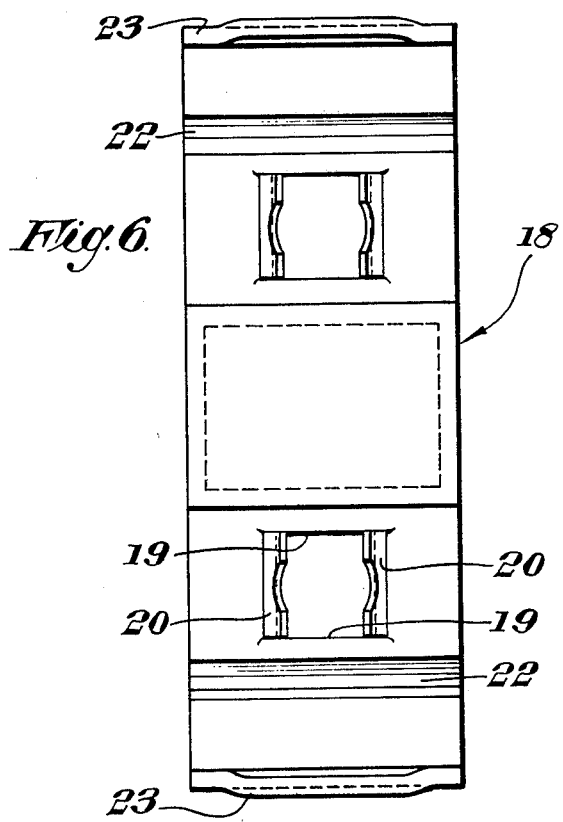
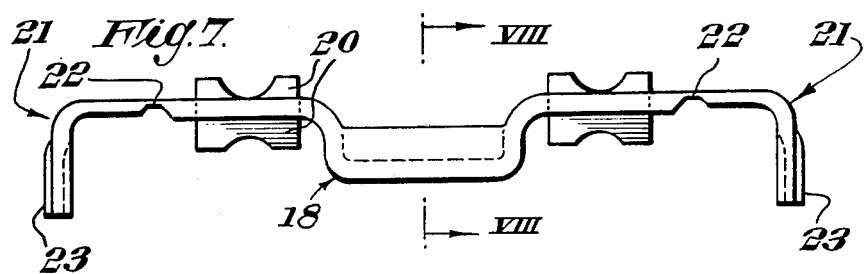
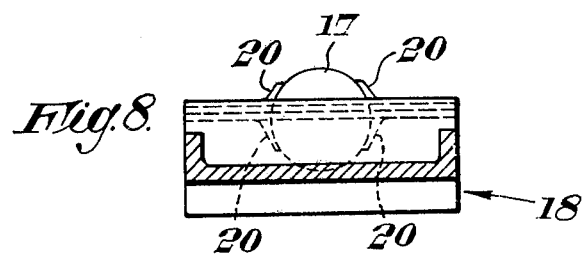

SEAT SLIDE MECHANISM

This invention relates to a seat slide mechanism.

From a first aspect, the present invention consists in a seat slide mechanism in which a slide and a rail are slideable one with respect to the other on four rollers arranged in space pairs between said slide and said rail, the rollers of each pair being accommodated in a roller retainer of which parts act as spacers between inwardly directed flanges on one of said slide and said rail, and outwardly directed flanges on the other of said slide and said rail, the roller retainer being made of a synthetic resin material having a low coefficient of friction.

In a preferred embodiment of said mechanism, the rail which is intended to be fixed has said outwardly directed flanges and the slide which is intended to be movable relative to the rail has said inwardly directed flanges, the slide being movable on the four rollers each of which is in contact with one of said outwardly directed flanges.

The parts of said roller retainer which act as spacers are preferably so curved or otherwise formed as to urge the inwardly directed flanges away from the outwardly directed flanges in a yielding manner, whereby the rattle of the slide and the rail is prevented.

The present invention will now be more particularly described with reference to the accompanying drawings, in which:

FIG. 1 illustrates a top plan view of a complete catch slide and rail assembly according to the present invention;

FIG. 2 illustrates a side elevation of the assembly shown in FIG. 1;

FIG. 3 illustrates an end elevation of said assembly and is drawn to a larger scale than FIGS. 1 and 2;

FIGS. 4 and 5 are end elevations of the rail and the slide, respectively;

FIGS. 6 and 7 illustrate a roller retainer in plan and in elevation, respectively without the rollers in position therein;

FIG. 8 illustrates a section on the line VIII—VIII of FIG. 7 but with a roller shown in position therein; and FIG. 9 illustrates an elevation, similar to that of FIG. 7, of the roller retainer, showing the manner in which two parts thereof hinge downwardly for the purpose described below.

Referring to the drawings, there is illustrated therein a seat slide mechanism which comprises a rail 10 intended to be fixed by bolts F to the floor of, for example, a motor vehicle, a slide 11 intended to be fixed by bolts S to the underside of a vehicle seat, a catch lever 12 pivotally connected at one end thereof to the slide 11 and at the other end thereof to one end of a catch lever operating handle 13, which is also pivotally connected to the slide 11.

The rail 10 has outwardly directed flanges 14 whose free edges 14a are turned upwardly for a purpose hereinafter referred to. The rail is of substantially U-section, and the flanges 14 are integral with the upright limbs of the U and are at the free ends of said limbs. In one of said limbs, holes 15 are provided.

The slide 11 is of channel section and is formed from a U-section member the free ends of whose limbs are bent inwardly to form inwardly directed flanges 16.

The rail 10 and the slide 11 are intended to be inserted into one another so that the outwardly directed flanges of the rail are positioned within the channel section slide. The slide 11 is supported on the rail 10 by spaced pairs of case-hardened steel rollers 17 which are accommodated in two spaced roller retainers 18.

Each retainer 18 is made of a synthetic resin material having a low coefficient of friction (for example polypropylene copolymer) and provides accommodation for two rollers 17 as can be seen from FIGS. 6, 7 and 8. Each of said rollers is made of case-hardened steel and is pushed, with a snap fit, into a space which is defined by the edges 19 and by oppositely concave-curved elements 20 whose free ends at least are flexible, the roller once located in said space being firmly retained therein with complete freedom for rotation therein.

Parts 21 of each roller retainer are so made as to hinge at reduced-thickness portions 22 into the positions thereof shown in FIG. 9.

Said retainer 18 is shown in FIG. 3 in the condition described in the preceding paragraph, the result being that the outwardly directed flanges 14 of the rail 10 and the inwardly directed flanges 16 of the slide 11 are separated by said parts 21 of the retainer, thereby eliminating all metal-to-metal contact between the rail and the slide and consequently eliminating rattle. The elimination of rattle is facilitated by the bowed portions 23 of the parts 21, said portions 23 providing some degree of resilience between the flanges 14 and 16.

It will be appreciated that the rollers 17 will, in use, be in contact with the upper surfaces (as seen in FIG. 4) of the flanges 14 and with the corresponding surface portions of the slide 11, the upturned edges 14a of the flanges 14 serving as guides for the vertical wall of the retainer.

The catch lever 12 is pivotally connected to the slide 11 by a spun rivet 24 and is then suitably cranked (see FIG. 2) to bring a portion 25 thereof into register with the holes 15 in the rail 10, said portion 25 being provided with three spaced prongs 26 which are intended to extend into three adjacent holes 15. The end of the lever 12 remote from the rivet 24 is pivotally connected to one end of the handle 13 by a rivet 27 and a locking washer 28. The handle 13 is pivotally connected to the slide 11 by a rivet 29 and a locking washer 30.

A tension spring 31 is anchored at its opposite ends to the slide 11 and to the handle 13 in order to urge the handle to keep the prongs 26 of the catch lever 12 in engagement with the respective holes 15 in the rail 10.

Stops 32 are provided in corresponding positions in both the rail 10 and the slide 11 when said rail and said slide are manufactured. Stops 33 are formed in the rail 10 when manufactured, but corresponding stops 34 are not formed in the slide 11 until after assembly of the slide, the rail and the roller retainers 18 and their captive rollers 17. The various stops 32, 33, 34 limit the extent of movement of the retainers 18 and prevent their becoming detached from the assembly.

It will be noted that one flange 16 of the slide 11 is cut-away at 35 for the accommodation of the prongs 26 which would, in the absence of said cut-away, foul the flange and be prevented from correct positive engagement of the holes 15.

The shank of the rivet 27 extends through an arcuate slot 40 formed in the slide 11. This slot permits the angular movements of the interconnected ends of the lever 12 and the handle 13 which are necessary when it is desired to move the slide 11 relative to the rail 10 to a new setting.

Some of the advantages obtained by the use of the seat slide mechanism described above are as follows:

The roller retainers 18, being of unit construction, are simple to handle by comparison with a number of relatively small parts which are only too easy for a person on an assembly line to drop, and may be very accurately molded. Besides positively retaining the rollers 17, the retainers also ensure or contribute to elimination of rattle between the metal parts, and also ensure smooth running of the slide on the rail.

Owing to the rollers 17 running on the upper surfaces of the flanges 14 of the rail, the center of the floor rail is clear for fixing bolts or rivets, as also is the slide from the catch mechanism outwards towards the ends of the slide.

This also enables the roller stops to be formed at the extreme ends of the sections, thus allowing the roller centers to be spaced well apart, thus giving stability to the mechanism.

Through using rollers instead of balls which are used on some other designs of slides, the roller track is prevented from brinelling by the width or axial dimension of the rollers in contact with said track, thus maintaining manufacturing tolerances between the sections and preventing rattle and slack movement due to wear.

The formation of the upturned edges 14a of the flanges 14 is carefully controlled in order to avoid edges having sharp burrs which in time would cut through the synthetic resin material. If said flanges were to be formed without those edges 14a, said material would not last long in those regions where the parts 21 would separate the edges of said flanges from the vertical portions (as seen in FIG. 3) of the slide 11. With those edges 14a, said parts 21 are to run or slide along smooth, non-cutting edges.

What I claim as my invention and desire to secure by Letters Patent of the United States is:

1. A seat slide mechanism comprising
   a. a rail securable to a floor so as to be fixed thereto;
   b. a slide securable to a seat so as to be fixed thereto, said rail and said slide being interengageable;
   c. two outwardly and oppositely directed flanges on said rail, each of said flanges having a track surface, said flanges having parallel marginal portions which extend along the outer edges of said tracks and which are substantially perpendicular to said track surfaces;
   d. two inwardly and oppositely directed flanges on said slide, said slide having two spaced parallel track surfaces;
   e. the track surfaces on said rail flanges being in vertical register with the spaced parallel track surfaces on said slide;
   f. two pairs of metal rollers in contact with said track surfaces, one of said pairs being spaced longitudinally of the rail and the slide from the other of said pairs, one roller of each pair being in contact with the track surface of one flange of said rail and with the corresponding track surface of the slide, and the other roller of each pair being in contact with the track surface of the other flange of said rail and with the other corresponding track surface of the slide;
   g. two roller retainers, each of which accommodates one pair of said pairs of rollers with freedom for rotation therein as the slide is moved relative to the rail and each of which is made of a synthetic resin material having a low coefficient of friction;
   h. each roller retainer comprising means defining two individual roller housings which are spaced from one another and each of which snugly accommodates and positively holds one roller of the pair associated therewith in a manner such that the roller retainer, when the seat slide mechanism is being assembled, can be held in any attitude without the rollers dropping out; and
   i. each roller retainer further having parts which embrace both the flanges on said rail and the parallel marginal portions of said flanges, whereby said roller retainers position the rollers on and guide the rollers along the respective track surfaces by virtue of the accommodation of each of said rollers within the confines of its own individual housing and whereby the stability of the slide relative to the rail in directions transverse to the longitudinal axis of said rail is maintained solely by the presence of those parts of the longitudinally spaced roller retainers which are sandwiched between and are in contact with the outer faces of said parallel marginal portions of the rail flanges and the portions of the slide which are aligned therewith at any particular time.

2. A seat slide mechanism as claimed in claim 1, wherein said means defining two individual roller housings which are spaced from one another comprise two concave-curved elements for each roller housing, said two elements having their concavities facing one another and being flexible at least at their free ends, whereby the rollers are pushed into the roller housings with a snap-fit and are retained therein with complete freedom for rotation.

3. A seat slide mechanism as claimed in claim 1, wherein each roller retainer consists of a main part and two other parts, one of said other parts being hingedly connected to one end of the main part, and the other of said other parts being hingedly connected to the other end of said main part, said other parts acting as spacers between at least the flanges on said rail and the flanges on said slide, whereby, after the rollers accommodated and positively held in the roller retainer have been placed on the track surfaces of the rail flanges and in the course of the rail and the slide being interengaged with one another, said other parts are turned around and under said rail flanges which are therefore spaced from the slide by said synthetic resin material.

4. A seat slide mechanism as claimed in claim 3, wherein a portion, which includes the free end, of each of said other parts is bowed transversely of the axis which is common to the roller housings, whereby, when the seat to which the slide is fixed is not supporting a load, said bowed portions tend to urge the rollers into contact with the four track surfaces and thereby eliminate rattle.

* * * * *